United States Patent
Dai et al.

(10) Patent No.: US 9,600,890 B2
(45) Date of Patent: Mar. 21, 2017

(54) IMAGE SEGMENTATION APPARATUS, MEDICAL IMAGE DEVICE AND IMAGE SEGMENTATION METHOD

(71) Applicant: Toshiba Medical Systems Corporation, Otawara-shi (JP)

(72) Inventors: Jing Dai, Beijing (CN); Qiuying Dong, Beijing (CN); Jia Wu, Beijing (CN)

(73) Assignee: Toshiba Medical Systems Corporation, Otawara-shi (JP)

( * ) Notice: Subject to any disclaimer, the term of this patent is extended or adjusted under 35 U.S.C. 154(b) by 0 days.

(21) Appl. No.: 14/199,021

(22) Filed: Mar. 6, 2014

(65) Prior Publication Data
US 2014/0254899 A1    Sep. 11, 2014

(30) Foreign Application Priority Data
Mar. 6, 2013   (CN) .......................... 2013 1 0071308

(51) Int. Cl.
*G06T 7/00*    (2006.01)

(52) U.S. Cl.
CPC .......... *G06T 7/0081* (2013.01); *G06T 7/0091* (2013.01); *G06T 2200/04* (2013.01); *G06T 2207/10072* (2013.01); *G06T 2207/20036* (2013.01); *G06T 2207/20141* (2013.01);
(Continued)

(58) Field of Classification Search
CPC ... G06T 7/0079; G06T 7/0081; G06T 7/0091; G06T 2207/20004; G06T 2207/20036; G06T 2207/20141; G06T 2207/20148; G06T 2207/20156; G06T 2207/30008; G06T 2207/30061; G06T 2207/30101; G06K 9/342; G06K 2209/05;
(Continued)

(56) References Cited

U.S. PATENT DOCUMENTS

| | | | |
|---|---|---|---|
| 8,045,769 B2 | 10/2011 | Wiemker et al. | 382/128 |
| 8,050,470 B2 | 11/2011 | Coenen et al. | 382/128 |
| 2006/0159328 A1 | 7/2006 | Vaz et al. | 382/131 |

(Continued)

FOREIGN PATENT DOCUMENTS

WO    WO 2007/002562 A2 *  1/2007    ............. G06T 19/00

OTHER PUBLICATIONS

Office Action issued Jun. 22, 2016, in Chinese Patent Application No. 201310071308.0 (with English-language Translation).
(Continued)

*Primary Examiner* — Andrew W Johns
(74) *Attorney, Agent, or Firm* — Oblon, McClelland, Maier & Neustadt, L.L.P.

(57) ABSTRACT

The disclosure provides an image segmentation apparatus, an image segmentation method and a medical image device for segmenting an object having a tree-shaped tubular structure from a volume image consisting of a series of images photographed on the basis of slices. The image segmentation apparatus comprises: a self-adaptive region growing unit configured to perform region growing according to the volume image, based on a seed point and a preset threshold to obtain at least one part of the tree-shaped tubular structure; and a growing control unit configured to change the preset threshold to re-perform the region growing until a given condition is met.

17 Claims, 7 Drawing Sheets

(52) U.S. Cl.
CPC ............... *G06T 2207/20156* (2013.01); *G06T 2207/30061* (2013.01)

(58) Field of Classification Search
CPC ............ G06K 2209/055; A61B 6/5205; A61B 6/5217
See application file for complete search history.

(56) References Cited

U.S. PATENT DOCUMENTS

| | | | | |
|---|---|---|---|---|
| 2007/0055455 A1* | 3/2007 | Wei et al. | ............. | G06T 7/0012 702/19 |
| 2009/0322748 A1* | 12/2009 | Chen et al. | ........... | G06T 7/0081 345/424 |
| 2010/0128940 A1* | 5/2010 | Buelow et al. | ....... | G06T 7/0081 382/128 |
| 2012/0207366 A1* | 8/2012 | Liu | ....................... | G06T 7/0081 382/128 |

OTHER PUBLICATIONS

Rafael Wiemker et al., "A Simple Centricity-based Region Growing Algorithm for the Extraction of Airways", MICCAI 2009, pp. 309-314.

\* cited by examiner

IMAGE SEGMENTATION APPARATUS, MEDICAL IMAGE DEVICE AND IMAGE SEGMENTATION METHOD

CROSS-REFERENCE TO RELATED APPLICATIONS

This application is based upon and claims the benefit of priority from Chinese Patent Application No. 201310071308.0, filed on Mar. 6, 2013, the entire contents of which are incorporated herein by reference.

FIELD

The present invention relates to the field of image processing and more particularly to an image segmentation apparatus and method and a medical image device.

BACKGROUND

In the field of image processing, there is an application of segmenting, from an image acquired, a part representing the structure of a target object. As a typical example, the structure is a tree-shaped tubular structure. Due to the limitations of various noises in the image and resolution, it might be difficult to obtain a complete and correct tree-shaped tubular structure directly from an image, especially when the region of interest is close to a twig. Therefore, a specific image segmentation method is usually needed to further process the image.

For instance, in modern medicine, the segmentation of an airway tree or blood vessel from an obtained medical image is of important clinical significance. Taking the airway tree as an example, the lung is scanned to obtain the volume image thereof in which pulmonary parenchyma and a desired airway tree structure are contained, and then the airway tree is segmented using various image segmentation methods, thereby facilitating the positioning of bronchia of different hierarchies and the measuring of characteristics of branches thereof.

BRIEF DESCRIPTION OF THE DRAWINGS

The present invention will be better understood with reference to the following description taken in conjunction with accompanying drawings in which identical or like reference signs designate identical or like components. The accompanying drawings, together with the detailed description below, are incorporated into and form a part of the specification and further serve to illustrate, by way of example, preferred embodiments of the present invention and to explain the principle and advantages of the present invention. In the accompanying drawings.

DETAILED DESCRIPTION

Figure 1:
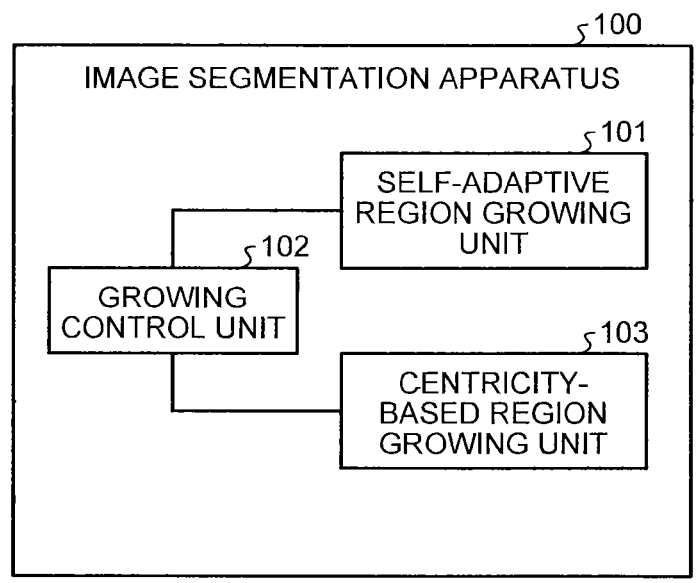
FIG. 1 is a block diagram illustrating the structure of an image segmentation apparatus according to an embodiment of the present invention.

A simplified summary of the present invention is given below to provide a basic understanding of some aspects of the present invention. It should be appreciated that the summary, which is not an exhaustive overview of the present invention, is not intended to identify the key or critical parts of the present invention nor limit the scope of the present invention, but merely to present some concepts in a simplified form as a prelude to the more detailed description that is discussed later.

It is an object of the present invention to provide an accurate and fast image segmentation apparatus and method and a medical image device.

According to an aspect of the present invention, there is provided an image segmentation apparatus for segmenting an object having a tree-shaped tubular structure from a volume image consisting of a series of images photographed on the basis of slices, comprising: a self-adaptive region growing unit configured to perform region growing on the basis of the volume image, based on a seed point and a preset threshold, to obtain at least one part of the tree-shaped tubular structure; and a growing control unit configured to change the preset threshold to re-perform the region growing until a given condition is met.

According to another aspect of the present invention, a medical image device comprises the image segmentation apparatus according to the above aspects of the invention.

According to another aspect of the present invention, there is provided an image segmentation method for segmenting an object having a tree-shaped tubular structure from a volume image consisting of a series of images photographed on the basis of slices, comprising: performing region growing on the basis of the volume image, based on a seed point and a preset threshold to obtain at least one part of the tree-shaped tubular structure; and changing the preset threshold to re-perform the region growing until a given condition is met.

Further, according to still another aspect of the present invention, there is provided a computer program for realizing the aforementioned image segmentation method.

Additionally, according to yet another aspect of the present invention, there is provided a computer program product in the form of a medium at least readable with a computer, on which computer program codes for realizing the aforementioned image segmentation method are recorded.

In the image segmentation method, the image segmentation apparatus and the medical image device disclosed herein, a relatively more accurate rough segmentation algorithm is used in combination with a fine segmentation algorithm, thus realizing accurate and fast image segmentation.

Embodiments of the invention are described below with reference to accompanying drawings. The elements and features described in one of the accompanying drawings or embodiments of the present invention may be combined with those shown in one or more other accompanying drawings or embodiments. It should be noted that for the sake of clarity, the representation and description on the components and processing that are irrelative with the present invention but well known by those skilled in the art are omitted.

As shown in FIG. 1, an image segmentation apparatus 100 for segmenting an object having a tree-shaped tubular structure from a volume image consisting of a series of images photographed on the basis of slices according to an embodiment of the present invention comprises: a self-adaptive region growing unit 101 configured to perform region growing on the basis of the volume image, based on a seed point and a preset threshold to obtain at least one part of the tree-shaped tubular structure; a growing control unit 102 configured to determine whether or not the at least one part of the tree-shaped tubular structure obtained by the self-adaptive region growing unit 101 is correct and change, in the case of determining that the at least one part of the tree-shaped tubular structure is incorrect, the preset threshold to re-perform the region growing until a given condition is met; and a centricity-based region growing unit 103 configured to perform centricity-limited region growing on the basis of the volume image, based on the seed point and the preset threshold to obtain at least one part of the tree-shaped tubular structure in the case that the self-adaptive region growing unit 101 cannot obtain a correct result.

The object having a tree-shaped tubular structure may contain or be contained in or intersected with another object, making it difficult to segment the object directly from the volume image. In some cases, the resolution of the obtained image is limited, which increases the difficulty of the segmentation as well. Examples of the object having a tree-shaped tubular structure include, but are not limited to: a road, the root system of a vegetable and a blood vessel, airway tree or skeleton of human body and so on, First, the object having the tree-shaped tubular structure is photographed on the basis of slices to obtain a series of images, which are laminated along the sliced direction to constitute a volume image reflecting the three-dimensional structure of the object. The self-adaptive region growing unit 101 sets one or more seed points in the volume image. Moreover, as the tube wall of the tree-shaped tubular structure to be segmented separates the internal cavity of the tree-shaped tubular structure from the surroundings to represent, in the image, the internal cavity and the surroundings as areas having different pixel value ranges, that is, having respective common features, therefore, the self-adaptive region growing unit 101 can realize region growing by determining whether or not points nearby a seed point have the feature or accord with a given growing standard through continuous comparison. Specifically, the self-adaptive region growing unit 101 can compare a point nearby the seed point with a preset threshold to determine whether or not to grow the point. The preset threshold can be set according to the range of the pixel values generally presented by the tree-shaped tubular structure in the image. Through such a growing process, at least one part of the tree-shaped tubular structure can be obtained.

The seed point may be set automatically. In one embodiment, the seed point can be set on the trunk of the tree-shaped structure through a simple preprocessing which is not described in further detail here.

However, as such growing is merely restrained by the preset threshold, in the case that the resolution of the image is relatively low or the size of the tubular structure is relatively small, there easily occurs error growing, for instance, a case where many pseudo branches are grown or the growing of a real branch is omitted. Thus, the image segmentation apparatus 100 provided herein determines the result of the growing using the growing control unit 102 and changes, in the case that the growing control unit 102 determines that there is error growing, the preset threshold and performing region growing again until a given condition is met.

In an embodiment, the given condition is that the number of times of performing the region growing reaches a given number or the preset threshold exceeds a preset range. For instance, when the preset threshold exceeds the range of the pixel values usually presented by the object in the image, the self-adaptive region growing unit 101 stops performing region growing.

Further, the growing control unit 102 is configured to make the determination according to the pixel percentage of the at least one part of the tree-shaped tubular structure grown by the self-adaptive region growing unit 101. For instance, if the pixel number of the grown tree-shaped tubular structure accounts for more than a given percentage of the pixel number of the whole image, then it is deemed that many of the branches grown are "pseudo branches" and that the tree-shaped tubular structure obtained at this time is incorrect. It should be appreciated that the rule for the determination is not limited thereto, but can be modified differently as needed.

As stated above, although the self-adaptive region growing unit 101 is advantageous in simplicity and rapidity, it may not necessarily obtain a correct and reliable segmentation result. To realize reliable image segmentation, the image segmentation apparatus 100 further comprises a centricity-based region growing unit 103 for replacing the self-adaptive region growing unit 101, when the self-adaptive region growing unit 101 cannot obtain a correct result, to perform a centricity-limited region growing.

The centricity-based region growing unit 103 further takes centricity into consideration when performing region growing. Specifically, for a given point in the volume image (referred hereinafter to as a voxel), N rays are cast in all the N directions in the three-dimensional space. It can be appreciated that the N rays can be divided into N/2 pairs, and that each pair of rays extend in opposite directions. The extension process may be achieved through region growing and is stopped when the rays extend to a possible tube wall of the tree-shaped tubular structure. Then, the centricity with respect to the voxel can be calculated using the lengths of all the line segments obtained. Only the voxel of which the centricity meets a given condition is reserved as a point of the tree-shaped tubular structure to be grown. The detailed description for the definition on the centricity and the centricity-based region growing may be referred to 'A Simple Centricity-based Region Growing Algorithm for the Extraction of Airways' issued by Rafael Wiemker etc, in EXACT09 airway segmentation challenge of the second international workshop on pulmonary image analysus (MICCAI 2009), the whole contents of which are incorporated herein by reference.

It may be appreciated that the greater the centricity of a voxel is, the more possible the point corresponding to the voxel is a point in the object. On this basis, a grown point having a centricity of higher than a certain value is selectively reserved to constitute the at least one part of the tree-shaped tubular structure.

It is experimentally proved that the image segmentation apparatus 100 having the above structure is capable of obtaining more accurate image segmentation results and effectively avoiding the generation of pseudo branches. Moreover, the user only needs to set related parameters, such as the preset threshold, the predetermined number of times or range, thus, the image segmentation apparatus 100 is greatly improved in usage convenience.

Figure 2:
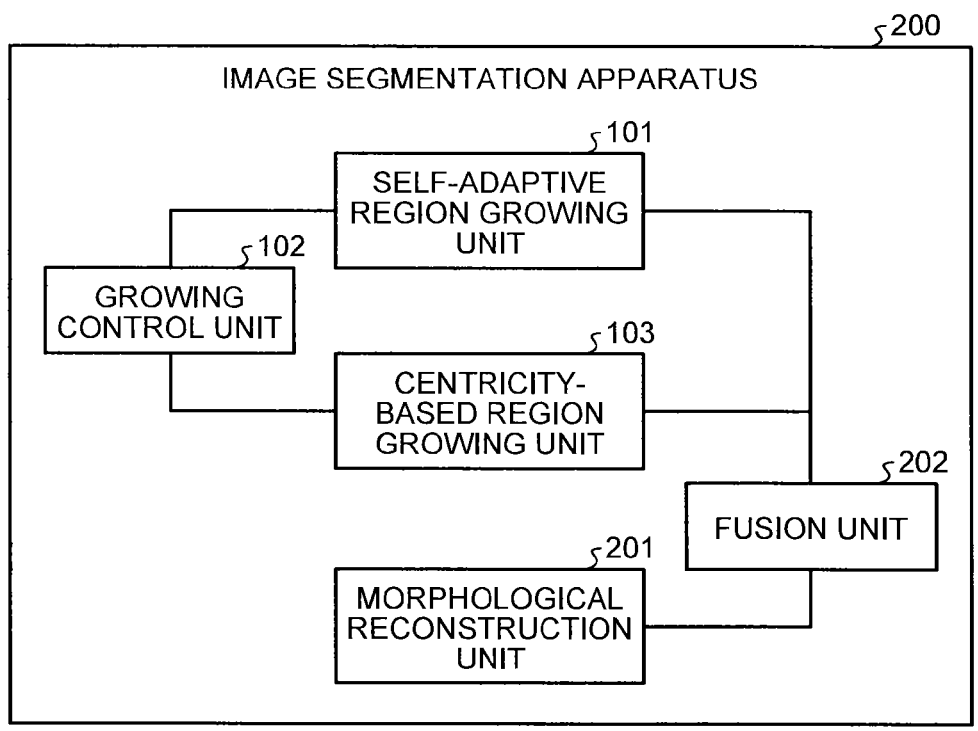
FIG. 2 is a block diagram illustrating the structure of an image segmentation apparatus according to another embodiment of the present invention.

The structure and the function of an image segmentation apparatus 200 according to another embodiment of the present invention are described with reference to FIG. 2. As shown in FIG. 2, in addition to the self-adaptive region growing unit 101, the growing control unit 102 and the centricity-based region growing unit 103, the image segmentation apparatus 200 further comprises: a morphological reconstruction unit 210 configured to perform morphological reconstruction based on local extrema for each of the series of images, to obtain candidate data capable of constructing a second part of the tree-shaped tubular structure; and a fusion unit 202 configured to fuse the at least one part of the tree-shaped tubular structure obtained by the self-adaptive region growing unit 101 or the centricity-based region growing unit 103 with the second part of the tree-shaped tubular structure constructed by at least one part of the candidate data obtained by the morphological reconstruction unit 201, to obtain the tree-shaped tubular structure of the object.

By including the morphological reconstruction unit 201, the image segmentation apparatus 200 according to the embodiment is capable of further segmenting a fine tubular region, that is, the image segmentation apparatus 200 is capable of extracting a tubular structure of a higher hierarchy of the object. To achieve a higher processing speed, the morphological reconstruction unit 201 may only act on the part of the image in which a fine tubular region is contained.

The morphological reconstruction unit 201 makes use of the following principle: a point corresponding to the inside of a tubular structure in the image is where a maximum or minimum pixel value is located. Therefore, it can be deemed that the local extrema of each slice of image correspond to candidate regions where tubular structures may be located, in other words, these candidate regions constitute candidates for the second part of the tree-shaped tubular structure.

However, actually, the candidate regions found may not be part of the tree-shaped tubular structure, and therefore, the fusion unit 202 may remove such pseudo regions in a particular way when fusing the above mentioned two parts of the tree-shaped tubular structure. For instance, the fusion unit 202 may screen the candidates for the second part of the tree-shaped tubular structure based on the spatial continuity of the tubular structure. It should be appreciated that the fusion should accord with certain logic and causal relationships but not be a simple combination.

As an example, the fusion unit 202 is configured to perform simple growing of the at least one part of the tree-shaped tubular structure based on the candidate data, the simple growing including growing the part of the candidate data spatially connected with each branch of the at least one part of the tree-shaped tubular structure into the second part of the tree-shaped tubular structure. In this example, the fusion unit 202 screens the candidate data based on the spatial continuity of the tubular structure, to obtain a second part of the tree-shaped tubular structure.

Figure 3:
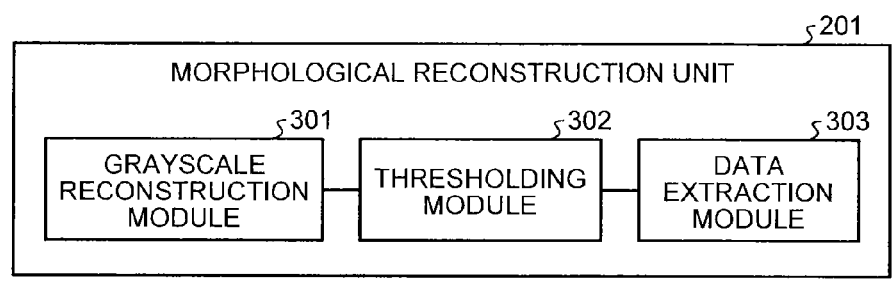
FIG. 3 is a block diagram illustrating the structure of a morphological reconstruction unit according to an embodiment of the present invention.

The structure and the function of the morphological reconstruction unit 201 according to an embodiment are exemplarily described in detail with reference to FIG. 3. As shown in FIG. 3, the morphological reconstruction unit 201 comprises: a grayscale reconstruction module 301 configured to perform grayscale morphological reconstruction for each one of the series of images, to obtain a marked image with the local extrema in the original image identifiable; a thresholding module 302 configured to compare the marked image with a second preset threshold and reserve merely the part of the marked image with a value higher than the second preset threshold; and a data extraction module 303 configured to extract the spatial coordinates of the part reserved by the thresholding module 302 and the corresponding pixel values in the original image as the candidate data.

The grayscale morphological reconstruction may be performed to identify the local extrema in the image. In short, structural elements of different sizes are employed to perform top-hat transformation or bottom-hat transformation on the image, to detect the peak (i.e., local maximum value) or valley (i.e., local minimum value) of a grayscale value, wherein in the top-hat transformation, the image obtained from an opening operation on the original image is subtracted from the original image to obtain a marked image, and in the bottom-hat transformation, the image obtained from a closing operation on the original image is subtracted from the original image to obtain a marked image. The size of the structural element employed should be smaller than that of a tubular structure of interest. The specific algorithm for the grayscale morphological reconstruction may be referred to, for example, 'Segmentation and Analysis of the Human Airway Tree From Three-Dimensional X-Ray CT images' issued by Deniz Aykac etc., in August 2003 in Vol. 22, No. 8, IEEE Transactions On Medical Imaging, the whole contents of which are incorporated herein by reference.

A bright point or area in the marked image obtained represents the position of a local extremum. However, as not all the bright points or areas are corresponding to actual tubular structures, the marked image should be thresholded if needed. In the embodiment, the thresholding module 302 only reserves the part of the marked image with a value higher than the second preset threshold and is therefore capable of removing most areas which are actually not a tubular structure.

Thus, it can be known that the selection of the second preset threshold, which may be performed based on the property of the object, the required segmentation precision and so on, determines the part finally reserved by the thresholding module 302. In an embodiment, the second preset threshold is some percentage of the difference between the maximum value and the minimum value in the marked image.

As stated above, after the reservation of the thresholding module 302, the data extraction module 303 only takes into consideration the part reserved as considered likely to be a tubular structure, and then extracts the spatial coordinates of the part and the corresponding pixel values in the original image as the candidate data for use by the fusion unit 202.

Figure 4:
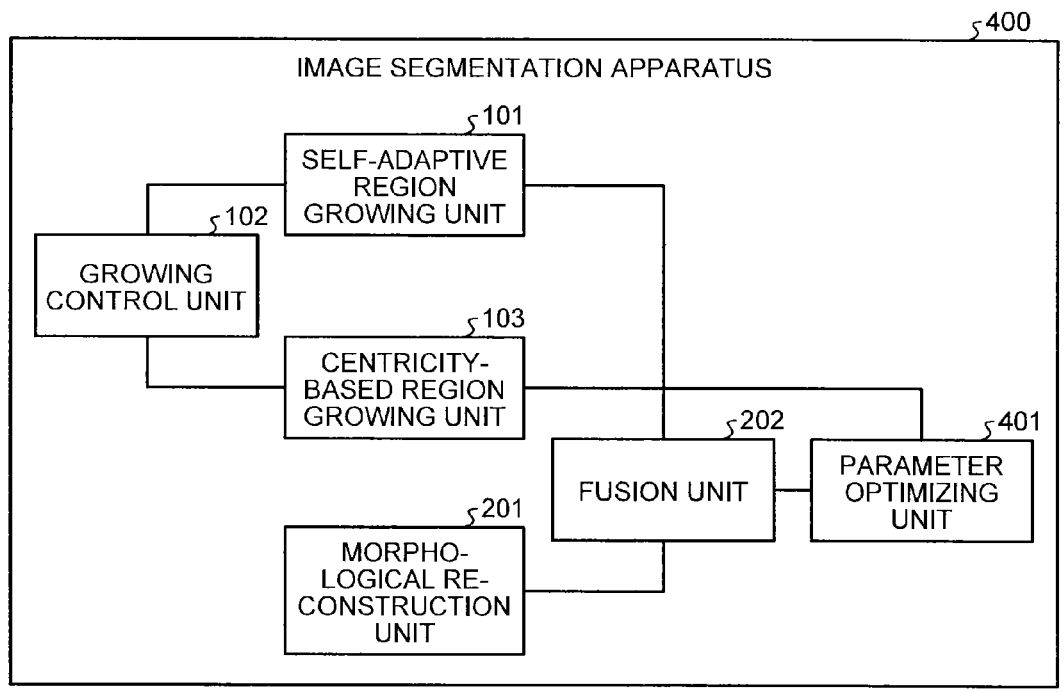
FIG. 4 is a block diagram illustrating the structure of an image segmentation apparatus according to still another embodiment of the present invention.

The image segmentation apparatus according to another embodiment of the present invention is described below with reference to FIG. 4, as shown in FIG. 4, in addition to the self-adaptive region growing unit 101, the growing control unit 102, the centricity-based region growing unit 103, the morphological reconstruction unit 201 having the structure shown in FIG. 3 and a fusion unit 202, the image segmentation apparatus 400 further comprises a parameter optimizing unit 401 configured to change the second preset threshold so that the ratio of the characteristic factor of the tree-shaped tubular structure obtained by the fusion unit 202 to the characteristic factor of the at least one part of the tree-shaped tubular structure obtained by the self-adaptive region growing unit 101 or the centricity-based region growing unit 103 becomes a given ratio.

The characteristic factor may be the pixel number, the volume, the shape and/or the size of the tree-shaped tubular structure. The given ratio may be set by the user as needed. By setting the ratio of the above characteristic factors to be a given ratio, an optimal segmentation result can be obtained.

In the image segmentation apparatus shown in FIG. 4, in order to further remove the pseudo branches in the obtained tree-shaped tubular structure, the fusion unit 202 is further configured to compare pixel values corresponding to the at least one part of the tree-shaped tubular structure and the second part of the tree-shaped tubular structure with the preset range of pixel value of the object, to remove the part of the tree-shaped tubular structure beyond the preset range of pixel value. As stated above, the preset range of pixel value of the object is, for example, the range of the pixel value usually presented by the object to be segmented in an image.

In an embodiment, the parameter optimizing unit 401 is configured to change the preset range and the second preset threshold so that the ratio of the above characteristic factors becomes a given ratio. It should be appreciated that the preset range and the second preset threshold may be changed just in a small range around an empirical value capable of realizing an excellent segmentation so as to improve the processing speed.

The image segmentation apparatuses according to embodiments of the present invention are described above with reference to accompanying drawings 1-4, and are applicable to various fields. The application of the image segmentation apparatus of the present invention in the segmentation of a medical image is described below by way of an example but not by way of limitation. It should be appreciated that the description is merely for illustration but is not intended to limit the application of the image segmentation apparatus, and that the application range of the image segmentation apparatus is not limited to medical images.

The medical image mentioned here can be an image formed by the data obtained by a medical diagnostic apparatus, which includes but is not limited to: an X-ray imaging diagnostic apparatus, an ultrasound (UL) diagnostic imaging apparatus, a computer tomography (CT) apparatus, a magnetic resonance imaging (MRI) diagnostic apparatus or a positron emission tomography (PET) apparatus and the like.

In medicine field, the object to be segmented refers usually to an airway tree, a blood vessel or a skeleton. The segmentation of an airway tree is exemplarily described here in detail.

As is well known, there are about 24 hierarchies from the airway to the pulmonary alveoli of a human being, as if it is an inverted tree, and the reconstruction of the structure of the airway tree on the basis of a medical image is of great clinic importance. However, as the structure of the airway tree is complicated and the branches of the higher hierarchy are finer, it is difficult to directly distinguish an airway from lung tissue in a medical image, and thus, subsequent image segmentation processing is needed to reconstruct the airway tree.

First, a hierarchical scanning is performed by a medical diagnostic apparatus to obtain a series of images of a lung, the images constituting the volume image of an airway tree to be segmented. Then, the volume image is segmented using the image segmentation apparatus 100, 200 or 400 according to the present invention.

If only a sketchy airway tree is needed, for instance, only the airway of a relatively low hierarchy is of interest, then the volume image may be segmented by the image segmentation apparatus 100, the specific structure and function of which are described above in detail and are therefore omitted here.

In this example, the growing control unit 102 determines whether or not the at least one part of the tree-shaped tubular structure obtained by the self-adaptive region growing unit 101 is correct based on the typical branch number of an airway tree.

Additionally, If a fine airway tree is needed, for instance, the airway of a relatively high hierarchy is also of interest, then the volume image may be segmented by the image segmentation apparatus 200 or 400, the specific structure and function of which are described above in detail and are omitted here.

In this example, the morphological reconstruction unit 201 performs morphological reconstruction based on local minimum value for each image, as the airway is expressed as the valley of grayscale in the image. To achieve a higher processing speed, the morphological reconstruction unit 201 may only reconstruct the relatively fine airway, i.e., airway of a relatively high hierarchy.

After the morphological reconstruction unit 201 obtains the candidate data, the fusion unit 202 performs further simple growing on the basis of the part of the airway tree obtained based on the candidate data, and selects the candidate data to be grown into a second part of the tree-shaped tubular structure according to the spatial continuity principle of airways. It should be appreciated that the simple growing further means a supplementation for the data obviously lost in actually successive airways.

Further, the parameter optimizing unit 401 further changes at least one of the preset range and the second preset threshold, so that the ratio of characteristic factors of the airway trees becomes a given ratio, thereby obtaining an optimal segmentation result. In an embodiment, the characteristic factor refers to the pixel number of the airway tree, and the given ratio is in the range of 1.1 to 1.25.

It is proved by a great number of experiments that the airway tree obtained is optimal when the given ratio is within 1.1 to 1.25, preferably, such as 1.2.

It should be appreciated that although the segmentation of an airway tree in the medical field is described herein, the description is only exemplary, and in practice, the image segmentation apparatus may be applied to segmenting an object having a tree-shaped tubular structure in various fields. The image segmentation apparatus disclosed herein has advantages of rapidity and accuracy.

It is apparent that some processing or methods are also disclosed in the description above on the image segmentation apparatus according to embodiments of the present invention. Below, the summary of the methods is described without repeating the details which are already discussed above, however, it should be noted that although disclosed in the description of the image segmentation apparatus, the methods do not certainly employ or are not certainly executed by the aforementioned components. For instance, embodiments of the image segmentation apparatus may be partially or completely achieved by hardware and/or firmware, and the image segmentation methods described below may be fully achieved by a computer-executable program, although the image segmentation methods may employ the hardware and/or firmware of the image segmentation apparatus.

Figure 5:
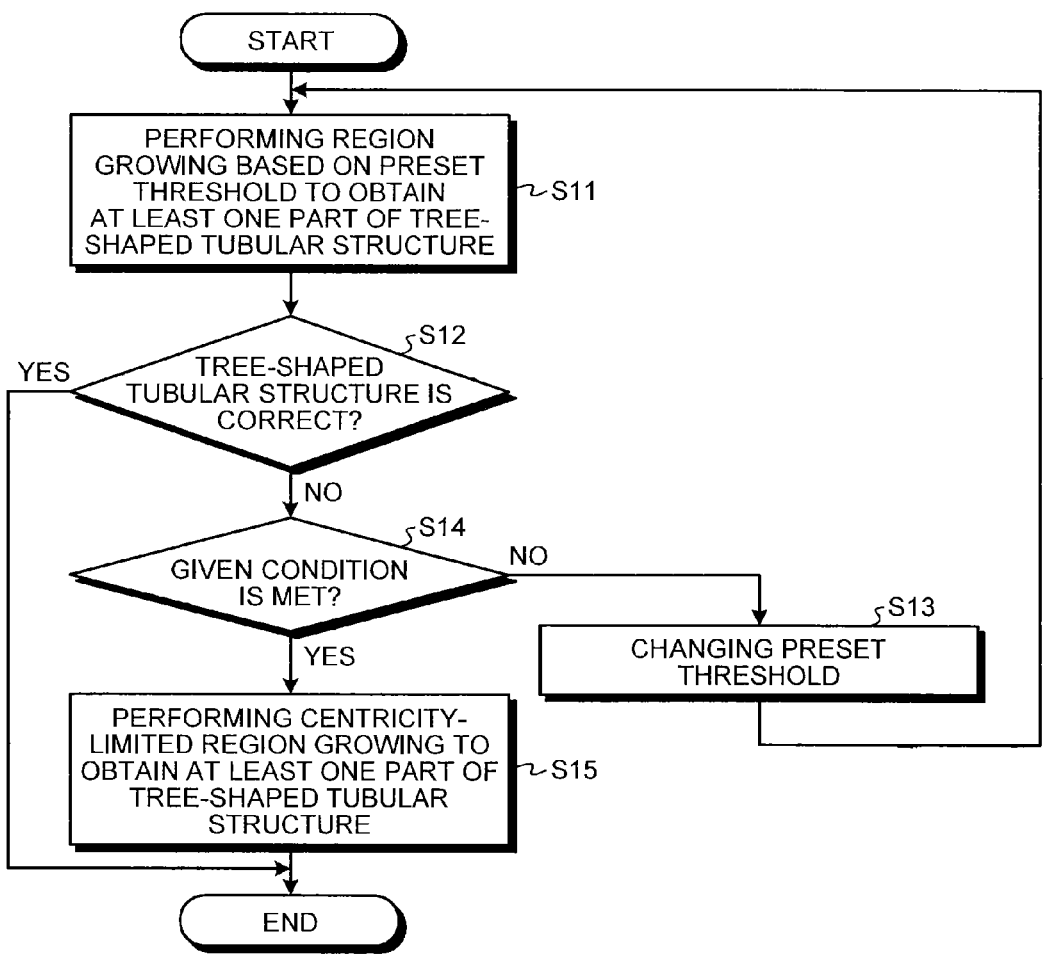
FIG. 5 is a flowchart of an image segmentation method according to an embodiment of the present invention.

FIG. 5 is a flowchart of an image segmentation method for segmenting an object having a tree-shaped tubular structure from a volume image consisting of a series of images photographed on the basis of slices according to an embodiment of the present invention, the image segmentation method comprises the following steps: performing region growing on the basis of the volume image, based on a seed point and a preset threshold to obtain at least one part of the tree-shaped tubular structure (S11); determining whether or not the at least one part of the tree-shaped tubular structure obtained is correct (S12); changing, in the case that the at least one part of the tree-shaped tubular structure as obtained is determined incorrect, the preset threshold (S13) to re-perform the region growing until a given condition is met (S14); and performing centricity-limited region growing on the basis of the volume image, based on the seed point and the preset threshold to obtain at least one part of the tree-shaped tubular structure in the case that no correct result can be obtained from the region growing (S15).

In the image segmentation method, the given condition mentioned in Step S14 is that the number of times of performing the region growing reaches a given number or the preset threshold exceeds a preset range. In Step S12, the determination is made according to the pixel percentage of the at least one part of the tree-shaped tubular structure obtained from the region growing.

Figure 6:
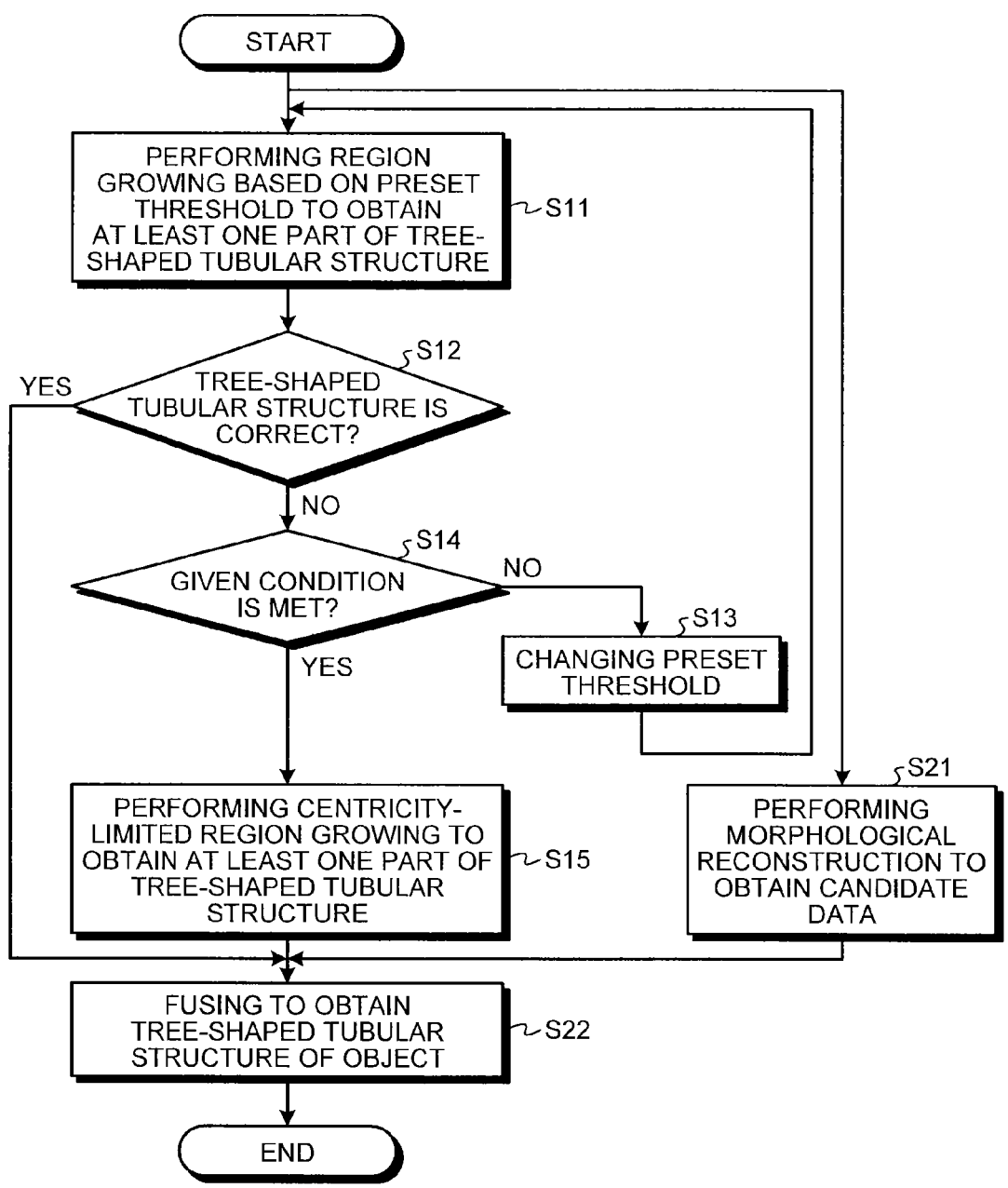
FIG. 6 is a flowchart of an image segmentation method according to another embodiment of the present invention.

FIG. 6 is a flowchart of an image segmentation method according to another embodiment of the present invention, as shown in FIG. 6, in addition to the steps shown in FIG. 5, the image segmentation method further comprises the following steps: performing morphological reconstruction based on local extrema for each of the series of images, to obtain candidate data capable of constructing a second part of the tree-shaped tubular structure (S21); and fusing the at least one part of the tree-shaped tubular structure with the second part of the tree-shaped tubular structure constituted by at least one part of candidate data, to obtain the tree-shaped tubular structure of the object (S22).

In an example, the fusion step S22 includes: performing simple growing of the at least one part of the tree-shaped tubular structure based on the candidate data, the simple growing including growing the part of the candidate data spatially connected with each branch of the at least one part of the tree-shaped tubular structure into the second part of the tree-shaped tubular structure.

Figure 7:
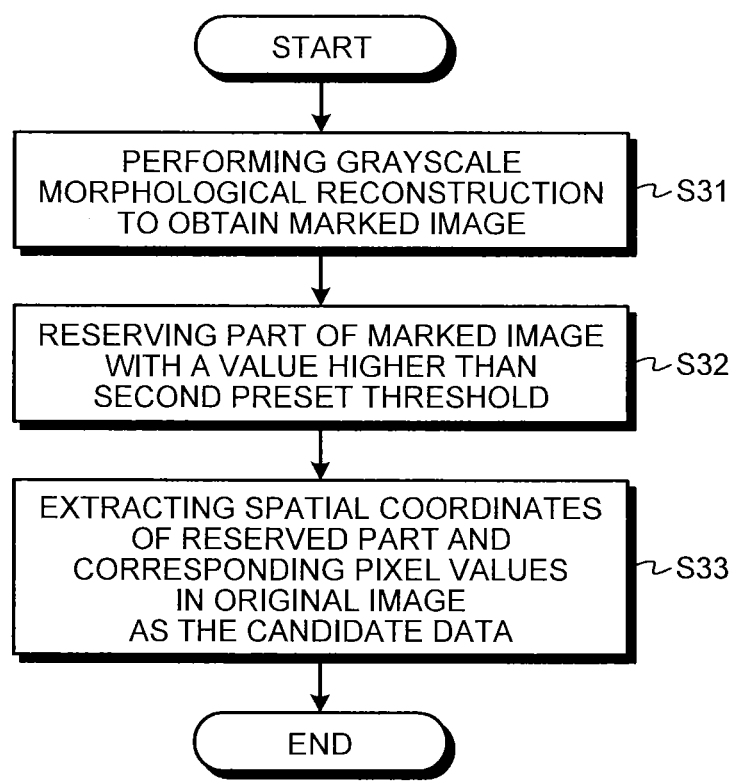
FIG. 7 is a flowchart of the candidate data acquisition step in the image segmentation method according to an embodiment of the present invention.

Further, FIG. 7 shows an example of the candidate data acquisition step S21, according to which Step S21 includes the following sub-steps: performing grayscale morphological reconstruction for each one of the series of images to obtain a marked image with the local extrema in an original image identifiable (S31); comparing the marked image with the second preset threshold and reserving merely the part of the marked image with a value higher than the second preset threshold (S32); and extracting the spatial coordinates of the reserved part of the marked image and the corresponding pixel values in the original image as the candidate data (S33).

The second preset threshold is a percentage of the difference between the maximum value and the minimum value in the marked image.

Figure 8:
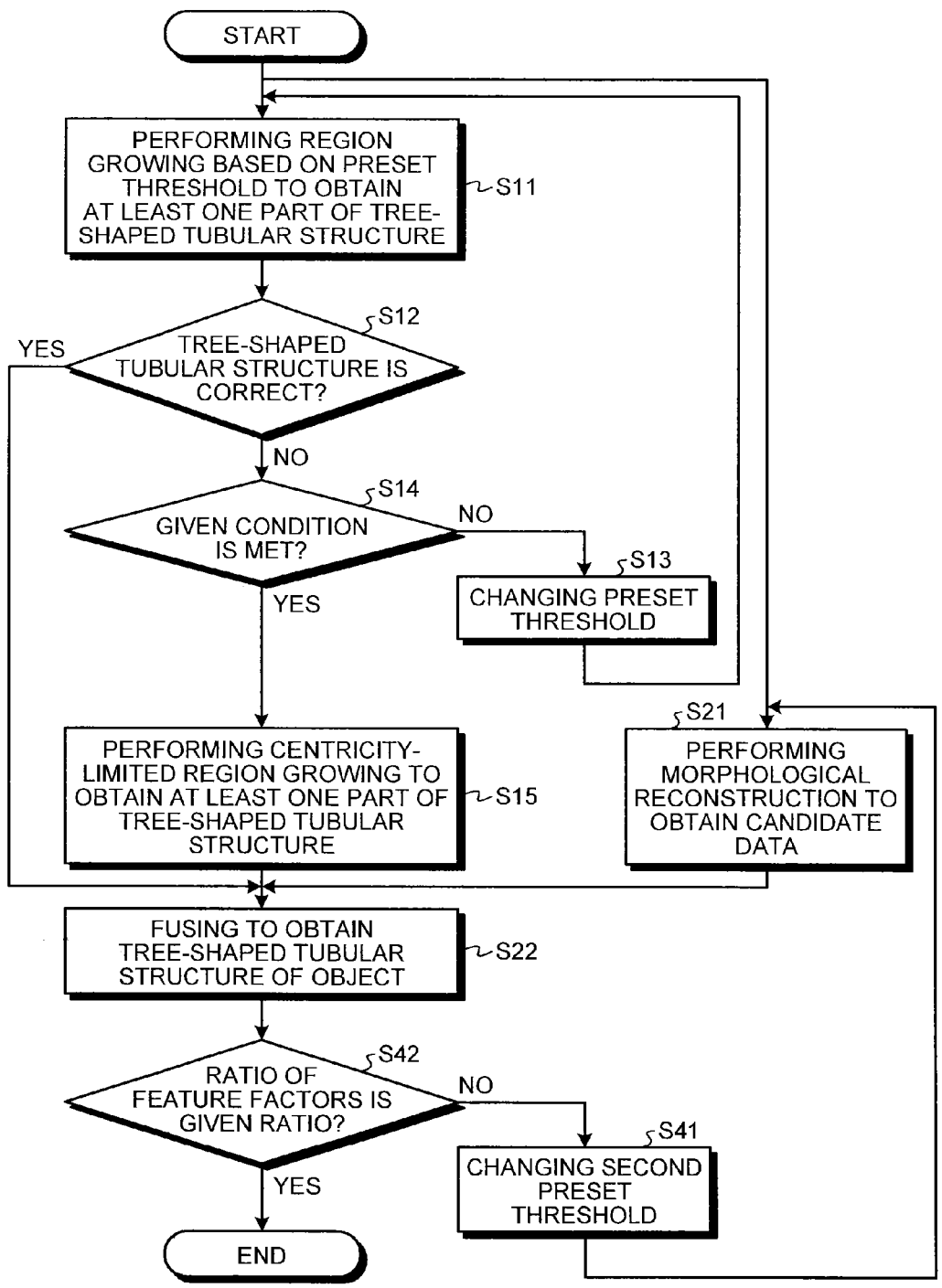
FIG. 8 is a flowchart of an image segmentation method according to still another embodiment of the present invention.

Further, FIG. 8 shows a variation of the image segmentation method shown in FIG. 6. As shown in FIG. 8, in addition to the steps shown in FIG. 6, the variation further includes a step of changing the second preset threshold S41 so that the ratio of the characteristic factor of the tree-shaped tubular structure obtained after the fusion to the characteristic factor of the at least one part of the tree-shaped tubular structure becomes a given ratio. The characteristic factor may be the pixel number, the volume, the shape and/or the size of the tree-shaped tubular structure.

Specifically, every time the second preset threshold is changed in Step S41, candidate data is extracted again and fused, then a determination is made in Step S42 on whether or not the ratio of the characteristic factor of the tree-shaped tubular structure obtained after the fusion to the characteristic factor of the at least one part of the tree-shaped tubular structure is a given ratio. If so, the processing is ended, and otherwise, the second preset threshold is changed again to repeat the operations above.

In another embodiment, the fusion step S22 further includes: comparing the pixel values corresponding to the at least one part of the tree-shaped tubular structure and the second part of the tree-shaped tubular structure with the preset range of pixel value of the object, to remove the part of the tree-shaped tubular structure the pixel value of which is beyond the preset range of pixel value.

Further, although not shown in FIG. 8, the preset range and the second preset threshold can be changed in Step S41 so that the ratio of the characteristic factors is a given ratio.

As an exemplary embodiment, the image is a medical image formed by the data obtained by a medical diagnostic apparatus. The object to be segmented is an airway tree, a blood vessel or a skeleton.

It should be appreciated that the image segmentation apparatus and method described herein are applicable to processing various images, for example, medical images. It is proved by experiments on a plurality of individuals that in the case that the object is an airway tree and the characteristic factor adopted is the pixel number of the airway tree, the optimal airway tree segmentation can be obtained when the given ratio is within a range of 1.1 to 1.25. Preferably, for example, when the given ratio is 1.2, the optimal airway tree segmentation can be obtained in most cases.

As stated above, the image segmentation method according to the present invention can effectively prevents the generation of pseudo branches and gains a relatively high calculation speed while maintaining the segmentation accuracy.

More specific detail of each step of the image segmentation method and more possible steps of the image segmentation method may be understood with reference to the description on each component of the image segmentation apparatus provided in embodiments of the present invention and are omitted here.

Figure 9:
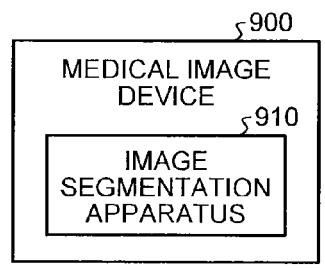
FIG. 9 is a schematic block diagram illustrating a medical image device according to an embodiment of the present invention.

FIG. 9 is a schematic block diagram illustrating a medical image device according to an embodiment of the present invention. In order not to obscure the spirit and scope of the present invention, other possible components of the medical image device are omitted in FIG. 9. The medical image device 900 comprises an image segmentation apparatus 910 which is arranged to process an input volume image. The image segmentation apparatus 910 may be the image segmentation apparatus 100, 200 or 400 described in any one of the embodiments above. The medical image device 900 may be, but not limited to: an X-ray imaging diagnostic apparatus, an ultrasound (UL) diagnostic imaging apparatus, a computer tomography (CT) apparatus, a magnetic resonance imaging (MRI) diagnostic apparatus, a positron emission tomography (PET) apparatus and the like.

The image segmentation apparatus may be arranged in a medical image device in a specific way or manner that is well known by those skilled in the art and is therefore not described herein.

As an example, each step of the aforementioned image segmentation method and each module and/or unit of the aforementioned image segmentation apparatus may be implemented as software, firmware, hardware or the combination thereof. In the case where the steps or modules and/or units are achieved through software or firmware, a software program for realizing the aforementioned method can be installed in a computer with a specific hardware structure (e.g. the general computer 1 0 1 0 1000 shown in FIG. 10) from a memory medium or network, and the computer, when installed with a program, is capable of realizing the functions of the program.

Figure 10:
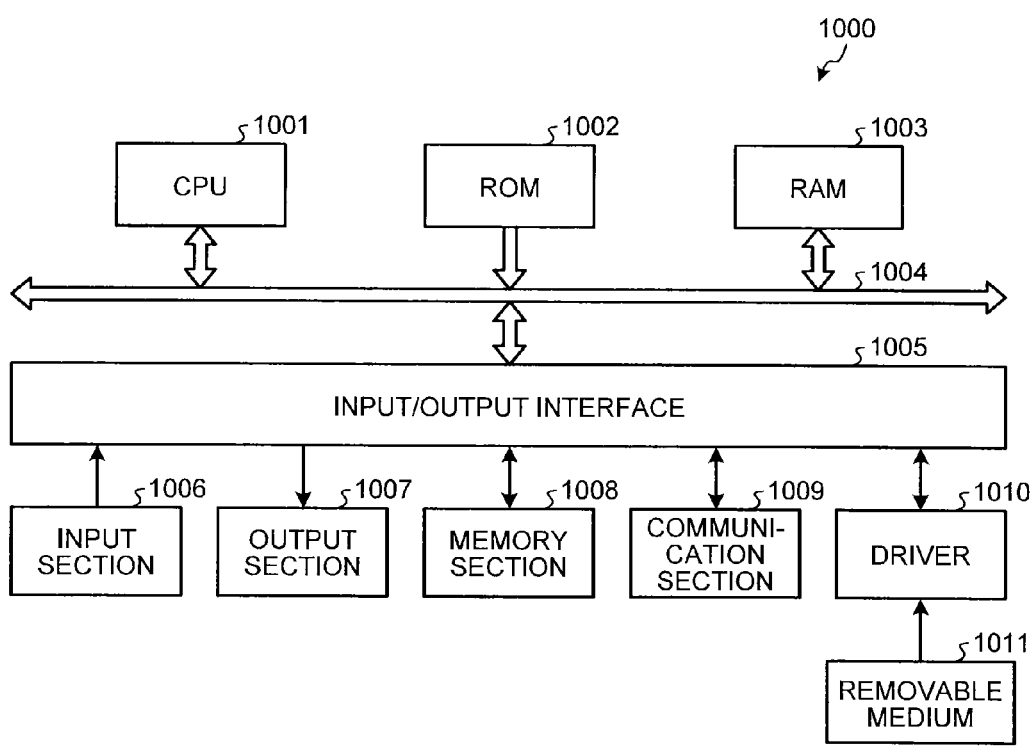
FIG. 10 is an exemplary block diagram illustrating the structure of a computer capable of realizing the embodiments/examples of the present invention.

In FIG. 10, a computing processing unit (namely, CPU) 1001 executes various processing according to a program stored in a read-only memory (ROM) 1002 or a program loaded to a random access memory (RAM) 1003 from a storage section 1008. The data needed for the various processing of the CPU 1001 may be stored in the RAM 1003 as needed. The CPU 1001, the ROM 1002 and the RAM 1003 are linked with each other via a bus 1004. An input/output interface 1005 is also linked to the bus 1004.

The following components are linked to the input/output interface 1005: an input section 1006 (including keyboard, mouse and the like), an output section 1007 (including displays such as cathode ray tube (CRT), a liquid crystal display (LCD), a loudspeaker and the like), a storage section 1008 (including hard disc and the like), and a communication section 1009 (including a network interface card such as a LAN card, modem and the like). The communication section 1009 performs communication processing via a network such as the Internet. A driver 1010 may also be linked to the input/output interface 1005, if needed. If needed, a removable medium 1011, for example, a magnetic disc, an optical disc, a magnetic optical disc, a semiconductor memory and the like, may be installed in the driver 1010 so that the computer program read therefrom is installed in the memory section 1008 as appropriate.

In the case where the foregoing series of processing is achieved through software, programs forming the software are installed from a network such as the Internet or a memory medium such as the removable medium 1011.

It should be appreciated by those skilled in the art that the memory medium is not limited to the removable medium 1011 shown in FIG. 10, which has program stored therein and is distributed separately from the apparatus so as to provide the programs to users. The removable medium 1011 may be, for example, a magnetic disc (including floppy disc (registered trademark)), a compact disc (including compact disc read-only memory (CD-ROM) and digital versatile disc (DVD), a magneto optical disc (including mini disc (MD) (registered trademark)), and a semiconductor memory. Alternatively, the memory medium may be the hard discs included in ROM 1002 and the storage section 1008 in which programs are stored, and can be distributed to users along with the device in which they are incorporated.

The present invention further discloses a program product in which machine-readable instruction codes are stored. The aforementioned image segmentation methods can be implemented when the instruction codes are read and executed by a machine.

Accordingly, a memory medium for carrying the program product in which machine-readable instruction codes are stored is also covered in the present invention. The memory medium includes but is not limited to soft disc, optical disc, magnetic optical disc, memory card, memory stick and the like.

In the foregoing description on the specific embodiments of the present invention, the features described and/or shown for an embodiment may be used in one or more other embodiments in the same or similar way or combined with those in the other embodiments, or replace those in the other embodiments.

It should be emphasized that the terms 'comprise/include', as used herein, means the existence of a feature, element, step or component in a way not exclusive of the existence or addition of one or more other features, elements, steps or components.

In the aforementioned embodiments and examples, each step and/or unit is represented with a reference sign consisting of figures. It should be understood by those of ordinary skill of the art that the reference signs are merely intended to facilitate description and drawing but are not to be construed as a limitation on an order or any other aspect.

Furthermore, the methods provided in the present invention may be performed sequentially, synchronously or independently in accordance with another time sequences, not limited to the time sequence described herein. Therefore, the implementation orders of the methods described in this specification are not to be construed as a limitation to the scope of the present invention.

Although the present invention has been disclosed with reference to specific embodiments herein, it should be understood that all the embodiments and examples described above are merely illustrative of the present invention but are not to be construed as limiting the present invention. Various modifications, improvements or equivalents can be devised by those skilled in the art without departing from the spirit and scope of the invention, and such modifications, improvements or equivalents should be considered to fall within the scope of the present invention.

What is claimed is:

1. An image segmentation apparatus for segmenting an object having a tree-shaped tubular structure from a volume image consisting of a series of images photographed on the basis of slices, comprising:
    processing circuitry configured to
        perform region growing on the basis of the volume image, based on a seed point and a preset threshold, to obtain at least one part of the tree-shaped tubular structure;
        determine whether or not the at least one part of the obtained tree-shaped tubular structure is correct;
        change, when determining that the at least one part of the tree-shaped tubular structure is incorrect and a given condition is not met, the preset threshold to re-perform the region growing until the given condition is met; and
        perform, when determining that the at least one part of the tree-shaped tubular structure is correct and the given condition is met, centricity-limited region growing on the basis of the volume image, based on the seed point and the preset threshold, to obtain at least one part of the tree-shaped tubular structure.

2. The image segmentation apparatus according to claim 1, wherein the given condition is that the number of times of performing the region growing reaches a given number, or the preset threshold exceeds a preset range.

3. The image segmentation apparatus according to claim 1, wherein the processing circuitry is further configured to determine whether or not the given condition is met according to a pixel percentage of the at least one part of the tree-shaped tubular structure grown by the processing circuitry.

4. The image segmentation apparatus according to claim 1, wherein the processing circuitry is further configured to:
perform morphological reconstruction based on local extrema for each one of the series of images, to obtain candidate data capable of constructing a second part of the tree-shaped tubular structure; and
fuse the at least one part of the obtained tree-shaped tubular structure with the second part of the tree-shaped tubular structure constructed by at least one part of the obtained candidate data to obtain the tree-shaped tubular structure of the object.

5. The image segmentation apparatus according to claim 4, wherein the processing circuitry is further configured to perform simple growing of the at least one part of the tree-shaped tubular structure based on the candidate data, the simple growing comprising growing the part of the candidate data spatially connected with each branch of the at least one part of the tree-shaped tubular structure into the second part of the tree-shaped tubular structure.

6. The image segmentation apparatus according to claim 4, wherein the processing circuitry is further configured to:
perform grayscale morphological reconstruction for each one of the series of images, to obtain a marked image with the local extrema in the original image identifiable;
compare the marked image with a second preset threshold and reserve merely a part of the marked image with a value higher than the second preset threshold; and
extract spatial coordinates of the part and the corresponding pixel values in the original image as the candidate data.

7. The image segmentation apparatus according to claim 6, wherein the processing circuitry is further configured to change the second preset threshold so that a ratio of a characteristic factor of the obtained tree-shaped tubular structure to a characteristic factor of the at least part of the obtained tree-shaped tubular structure becomes a given ratio.

8. The image segmentation apparatus according to claim 7, wherein the processing circuitry is further configured to compare the pixel values corresponding to the at least one part of the tree-shaped tubular structure and the second part of the tree-shaped tubular structure with a preset range of pixel value of the object, to remove the part of the tree-shaped tubular structure the pixel values of which are beyond the preset range of pixel value.

9. The image segmentation apparatus according to claim 8, wherein the processing circuitry is further configured to change the preset range and the second preset threshold, so that the ratio of the characteristic factors becomes the given ratio.

10. The image segmentation apparatus according to claim 7, wherein the characteristic factor is at least one of a pixel number, a volume, a shape, and a size of the tree-shaped tubular structure.

11. The image segmentation apparatus according to claim 7, wherein the object is an airway tree, the characteristic factor is a pixel number of the airway tree, and the given ratio is in the range of 1.1 to 1.25.

12. The image segmentation apparatus according to claim 1, wherein the image is a medical image formed by data obtained by a medical diagnostic apparatus.

13. The image segmentation apparatus according to claim 1, wherein the object is an airway tree, a blood vessel or a skeleton.

14. A medical image device, comprising an image segmentation apparatus for segmenting an object having a tree-shaped tubular structure from a volume image consisting of a series of images photographed on the basis of slices, wherein the image segmentation apparatus includes:
processing circuitry configured to
perform region growing on the basis of the volume image, based on a seed point and a preset threshold, to obtain at least one part of the tree-shaped tubular structure;
determine whether or not the at least one part of the obtained tree-shaped tubular structure is correct; and
change, when determining that the at least one part of the tree-shaped tubular structure is incorrect, the preset threshold to re-perform the region growing until a given condition is met.

15. The medical image device according to claim 14, wherein the medical image device is a computer tomography device or a magnetic resonance imaging device.

16. The medical device of claim 14, wherein the processing circuitry is further configured to
change, when determining that the at least one part of the tree-shaped tubular structure is incorrect and the given condition is not met, the preset threshold to re-perform the region growing until the given condition is met; and
perform, when determining that the at least one part of the tree-shaped tubular structure is correct and the given condition is met, centricity-limited region growing on the basis of the volume image, based on the seed point and the preset threshold, to obtain at least one part of the tree-shaped tubular structure.

17. An image segmentation method for segmenting an object having a tree-shaped tubular structure from a volume image consisting of a series of images photographed on the basis of slices, comprising:
performing region growing on the basis of the volume image, based on a seed point and a preset threshold, to obtain at least one part of the tree-shaped tubular structure;
determining whether or not the at least one part of the obtained tree-shaped tubular structure is correct;
changing, when determining that the at least one part of the tree-shaped tubular structure is incorrect and a given condition is not met, the preset threshold to re-perform the region growing until a given condition is met; and
performing, when determining that the at least one part of the tree-shaped tubular structure is correct and the given condition is met, centricity-limited region growing on the basis of the volume image, based on the seed point and the preset threshold, to obtain at least one part of the tree-shaped tubular structure.

* * * * *